United States Patent [19]

Halonen et al.

[11] Patent Number: 4,673,326
[45] Date of Patent: Jun. 16, 1987

[54] BRIDGE AND STOPPER MECHANISM FOR AN APPARATUS FOR LATERAL TRANSFER OF ROLLER PALLETS

[75] Inventors: Heino T. K. Halonen, Hyvinkää ; Jukka I. Pohjonen, Helsinki, both of Finland

[73] Assignee: Elevator GmbH, Baar, Switzerland

[21] Appl. No.: 738,761

[22] Filed: May 24, 1985

[30] Foreign Application Priority Data

May 24, 1984 [FI] Finland ............................. 842089

[51] Int. Cl.$^4$ .............................................. B65G 1/06
[52] U.S. Cl. .................................... 414/286; 14/69.5; 108/7; 211/170; 414/267; 104/256
[58] Field of Search ............... 414/286, 276, 462, 267, 414/228, 537, 229, 241, 253, 258; 14/69.5, 71.1, 71.3, 71.5, 71.7, 72.5; 108/6, 7; 211/150, 170; 104/254, 255, 256

[56] References Cited

U.S. PATENT DOCUMENTS

| | | | |
|---|---|---|---|
| 2,915,203 | 12/1959 | Kurmer | 414/258 X |
| 3,043,451 | 7/1962 | Ghionda | 414/258 |
| 3,786,942 | 1/1974 | Dane, Jr. | 414/286 X |
| 3,921,842 | 11/1975 | Campbell | 414/462 |
| 4,197,047 | 4/1980 | Halidmann | 414/276 |

FOREIGN PATENT DOCUMENTS

| | | | |
|---|---|---|---|
| 637840 | 3/1962 | Canada | 187/9 R |
| 1346583 | 11/1963 | France | 414/258 |
| 1187260 | 4/1970 | United Kingdom | 414/282 |

*Primary Examiner*—Frank E. Werner
*Attorney, Agent, or Firm*—Browdy and Neimark

[57] ABSTRACT

A bridge and stopper mechanism for an apparatus for lateral transfer of roller pallets, the apparatus serving to transfer roller pallets and employing bridges as extensions of rails between the shelving and the transporter body, the stopper being placed on the shelving to control the access of roller pallets to the lateral transporter. To reduce the number of hydraulic cylinders and to simplify the operation of the mechanism, the invention is implemented in such manner that at least one stopper actuator lever is pivoted on each end of the internal transporter body, the said levers being connected to the bridges and moving along with these. When pressing against the base of the stopper peg, the stopper actuator lever is turned from a horizontal position to a low position.

3 Claims, 3 Drawing Figures

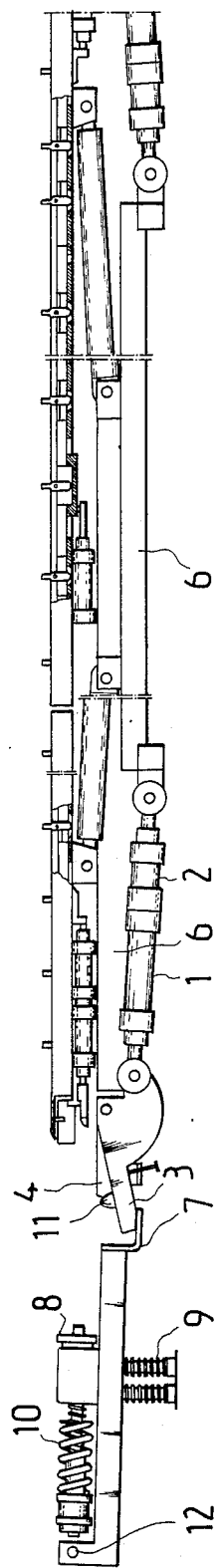
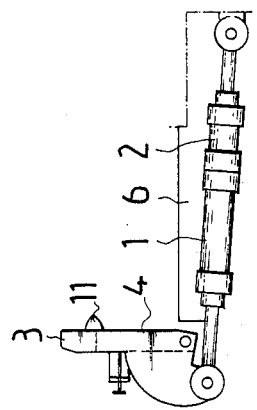
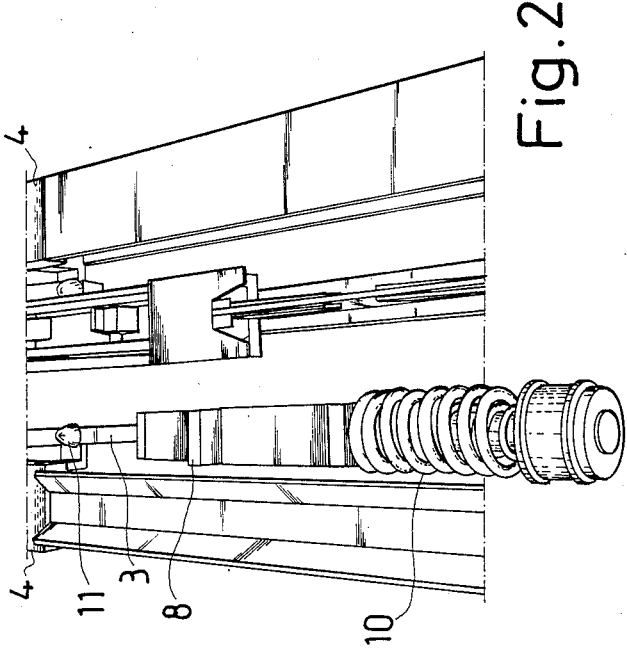
Fig. 1
Fig. 3
Fig. 2

BRIDGE AND STOPPER MECHANISM FOR AN APPARATUS FOR LATERAL TRANSFER OF ROLLER PALLETS

BACKGROUND OF THE INVENTION

The present invention concerns a bridge and stopper mechanism for an apparatus for lateral transfer of roller pallets, such an apparatus being hereinafter referred to as "lateral transporter", serving to transfer roller pallets and employing bridges to provide rail extensions between the shelving and the body of the lateral transporter, the stopper being placed on the shelving to control the access of the roller pallets to the lateral transporter.

"Roller pallet" refers in this context to platforms used for carrying goods and provided with wheels. Such platforms may also have walls and a roof.

The bridges employed with this kind of apparatus should be so arranged that, when in the horizontal position, they permit a smooth transfer of roller pallets to and from the lateral transporter. For example, to move roller pallets from the shelving onto the lateral transporter, the pallets are picked up, one or more at a time, and transferred by some means onto the carriage, during which time the next pellets are waiting for their turn at the unloading end of the shelving, kept in place by a stopper mechanism activated when the last pellet to be picked up has passed it. The bridge and the stopper are powered by separate hydraulic cylinders.

SUMMARY OF THE INVENTION

The object of the present invention is to achieve a mechanism that operates on a simple principle and does not necessarily require a separate hydraulic cylinder for actuating the stopper. Accordingly, the invention is characterized in that there is at least one stopper actuator lever pivoted at each end of the body of the lateral transporter, these stopper actuators being connected to the bridges and arranged so as to move along with these, and when pressed against the base of the stopper peg, the stopper actuator lever moves down from the horizontal position. When the stopper actuator lever is raised from its lowest position to the horizontal position, the stopper peg also rises. Thus the operation of the stopper is solely dependent on the position of the actuator levers and the bridges. This eliminates the problems relating to synchronization between the bridges and the stopper.

An advantageous embodiment of the invention is characterized in that the stopper actuator levers, together with the bridges, are powered by two hydraulic cylinders, one of which serves to raise these pivoted members, while the other is used for lowering the stopper actuator lever. This arrangement offers the advantage that the bridges can be lowered to the horizontal position with an essentially improved accuracy.

Another advantageous embodiment of the invention is characterized in that the free ends of the stopper actuator levers are provided with rubber pads which, when the levers are in their raised position, press against the roller pallet on the lateral transporter. The stopper actuator levers thus offer the additional advantage of keeping the roller pallets steady when the lateral transporter is travelling on its track to move to another shelf.

A further advantageous embodiment of the bridge and stopper mechanism of the invention is characterized in that the stopper peg is provided with a spring to absorb shocks from the direction from which the roller pallets approach it, thus preventing violent stopping of the pallets. This is very important, because if a loaded pallet is suddenly stopped without damping the shock, the load may be shifted or damaged.

Yet another advantageous embodiment of the invention is characterized in that the base member on which the stopper peg is fixed is pivoted at one end and rests on springs provided below it. This arrangement has the effect that, when the stopper actuator levers are turned from their low position to the horizontal position, the stopper base and the peg fixed on it are raised by the springs, whereby the stopper peg is brought to its operating position.

BRIEF DESCRIPTION OF THE DRAWINGS

The invention is described in greater detail in the following by the aid of an example, reference being made to the drawings attached, wherein:

FIG. 1 presents a longitudinal section of the bridge/stopper mechanism according to the invention and of a lateral transporter provided with bridges.

FIG. 2 presents an advantageous embodiment of the mechanism in top view.

FIG. 3 presents a stopper actuator lever in its raised position, the pistons in the cylinders being in their outer position.

DESCRIPTION OF THE PREFERRED EMBODIMENT

FIG. 1 shows an advantageous embodiment of the mechanism of the invention. In this embodiment, the bridges 4 and the stopper actuator levers 3 are pivoted about a common axes at the end of the body of the lateral transporter 6. The stopper actuator lever 3, visible in FIG. 1 has length longer than the end of its associated bridge 4, and this longer end presses against the stopper base end part 7. The stopper actuator levers, along with the bridges, are turned by means of two hydraulic cylinders 1, 2, cylinder 1 being used for turning them up from the horizontal position, and cylinder 2 for turning them back down to the horizontal position. The cylinders 1 and 2 have been arranged between the lever 3 and the transporter 6. The operation of the levers is as follows: The levers 3 and simultaneously the bridges 4 are turned by means of cylinder 1 from their first position (FIG. 3) to about 90° toward the left, whereby bridges 4 meet a firm obstacle and stop there. Thereafter, by means of cylinder 2, the levers 3 turn further about 15° to their end positions, whereby the lever 3 shown in FIG. 1, which is provided with a longer end, presses with that longer end against the stopper base end 7, keeping the stopper peg 8 down. When a roller pallet is being moved from the shelf onto the carriage, the bridges 4 are naturally in their horizontal position, providing an extension from the shelving rails to the transporter rails.

Once the roller pallet has crossed the bridge 4, the hydraulic cylinder 1 starts to operate, causing the stopper actuator levers 3 and the bridges 4 to turn up. The stopper base end part 7 is thus released and, lifted by the springs 9, rises to its high position, thereby raising the stopper peg 8 to prevent the next pallets from rolling onto the lateral transporter 6.

The stopper peg 8 is provided with a spring 10 to damp the impact when roller pallets bump against the peg.

When the roller pallet has been brought to a suitable position on the lateral transporter 6 and no more pallets are to be taken along, the bridges 4 and the stopper actuators 3 are turned to an upright position, so that the rubber pads 11 on the ends of the actuator levers 3 are pressed against the side of the pallet placed near the edge on the transporter.

It is obvious to a person skilled in the art that the invention is not confined to the embodiment discussed above as an example but may be varied within the scope of the following claims.

We claim:

1. In an apparatus for lateral transfer of roller pallets from first storage shelving to second storage shelving, the apparatus including rails associated with the first and second shelving, a bridge and stopper mechanism comprising:
   at least one bridge associated with said rails, each said bridge constituting a rail extension and being mounted on an end body portion of the apparatus and being pivotable between said shelving and said body portion of the apparatus,
   movable stop means, associated with each said bridge, for selectively controlling access of the roller pallets on the first shelving to the body of the apparatus,
   said controlling means including
   (a) at least one actuator lever having a first end pivotally supported by the body of the apparatus adjacent each said rail, said lever being parallel to and coextensive with said bridge and a second free end,
   (b) means for reversibly pivoting each said actuator lever and its associated bridge, with respect to the body of the apparatus, between a first position in which said each actuator lever and its associated bridge assumes a substantially horizontal disposition so that desired number of roller pallets can transfer from the first storage shelving to the body of the apparatus, and a second position in which each said actuator lever and its associated bridge assumes a substantially vertical disposition so that the transfer of said desired number of pallets can stop, and
   means for reversibly rotating said actuator lever to a third position below said first position for releasing said stop controlling means to provide access for roller pallets on said first storage shelving to the body of the apparatus.

2. A bridge and stopper mechanism as set forth in claim 1, wherein
   said reversibly pivoting means comprises a first hydraulic cylinder and said reversibly rotating means comprises a second hydraulic cylinder,
   said rotating means being provided to move said actuator lever below said first position through an angle of from about 10° to about 20°.

3. A bridge and stopper mechanism as set forth in claim 1, wherein each said actuator lever free end includes a rubber pad for maintaining said pallets steady on the body of the apparatus when said lever is disposed in said second position.

* * * * *